US010659606B2

(12) United States Patent
Thomas et al.

(10) Patent No.: US 10,659,606 B2
(45) Date of Patent: May 19, 2020

(54) FILTERING UNSOLICITED INCOMING CALLS

(71) Applicant: International Business Machines Corporation, Armonk, NY (US)

(72) Inventors: Caroline J. Thomas, Eastleigh (GB); Thomas J. Waterton, Southampton (GB); Liam White, Hook (GB); Joshua E. Vines, Telford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/154,094

(22) Filed: Oct. 8, 2018

(65) Prior Publication Data

US 2020/0112636 A1    Apr. 9, 2020

(51) Int. Cl.
*H04M 3/436* (2006.01)
*H04M 1/57* (2006.01)
(Continued)

(52) U.S. Cl.
CPC ......... *H04M 3/4365* (2013.01); *H04M 1/573* (2013.01); *H04M 1/575* (2013.01);
(Continued)

(58) Field of Classification Search
CPC ........ H04M 3/436; H04M 1/57; H04M 1/663; H04M 3/42; H04M 3/533; H04M 3/54; H04M 3/4365; H04M 3/5308; H04M 3/541; H04M 1/575; H04M 3/42068; H04M 7/0033; H04M 2203/2027; H04M 2203/2033; H04M 1/274583; H04M 2250/60; H04M 1/573; H04M 3/53308; H04M 1/0033; H04M 15/41; H04M 3/42025; H04M 3/42034; H04M 3/42059; H04M 3/42042; H04M 3/42093;
(Continued)

(56) References Cited

U.S. PATENT DOCUMENTS 6,510,217 B1 * 1/2003 Welch et al. ............ 379/211.02
6,788,775 B1 * 9/2004 Simpson .................. 379/207.13
(Continued)

OTHER PUBLICATIONS

Goggle, "Calendar API", printed Aug. 23, 2018, 5 pages, https://developers.google.com/google-apps/calendar/.
(Continued)

*Primary Examiner* — Meless N Zewdu
(74) *Attorney, Agent, or Firm* — Daniel Yeates

(57) ABSTRACT

A mechanism for filtering communication including receiving an incoming call from a calling party, the incoming call being directed to a called party. The mechanism further comprises obtaining calling party information comprising a value of at least one descriptive parameter of the calling party and obtaining historical called party information relating to past activities of the called party. One or more call-handling rules are generated based on the historical called party information, each call-handling rule defining how to handle an incoming call based on a descriptive parameter of a calling party. The calling party information is processed according to the one or more call-handling rules to determine how to handle the received incoming call.

17 Claims, 8 Drawing Sheets

(51) Int. Cl.
*H04M 3/54* (2006.01)
*H04M 3/42* (2006.01)
*H04M 3/533* (2006.01)
*H04M 1/663* (2006.01)

(52) U.S. Cl.
CPC ....... *H04M 1/663* (2013.01); *H04M 3/42068* (2013.01); *H04M 3/53308* (2013.01); *H04M 3/541* (2013.01)

(58) Field of Classification Search
CPC ....... H04M 3/4211; H04W 4/16; H04W 4/20; H04W 36/0027; H04W 36/0033; H04W 36/0038; H04W 68/00; H04W 68/005; H04W 68/02; H04W 76/00; H04W 76/10; H04W 76/11; H04W 88/02; H04W 88/04; H04W 12/02; H04W 4/02
See application file for complete search history.

(56) References Cited

U.S. PATENT DOCUMENTS

| | | | | |
|---|---|---|---|---|
| 8,141,152 | B1* | 3/2012 | Hwang et al. | 726/22 |
| 8,189,760 | B2* | 5/2012 | Levine | 379/211.02 |
| 8,199,899 | B2* | 6/2012 | Rogers et al. | 379/265.01 |
| 8,345,843 | B2* | 1/2013 | Lidstrom et al. | 379/142.06 |
| 8,355,491 | B1 | 1/2013 | Butt | |
| 8,594,298 | B2 | 11/2013 | Klein et al. | |
| 8,670,545 | B2* | 3/2014 | Vendrow | 379/211.01 |
| 8,774,379 | B1* | 7/2014 | Youngs et al. | 379/142.02 |
| 8,805,328 | B2 | 8/2014 | Varanasi | |
| 8,953,768 | B2 | 2/2015 | Chua et al. | |
| 10,009,462 | B1 | 6/2018 | Collinson et al. | |
| 2006/0182029 | A1* | 8/2006 | Kealy et al. | 370/230 |
| 2006/0188081 | A1* | 8/2006 | Hooper et al. | 379/211.02 |
| 2006/0210032 | A1* | 9/2006 | Grech et al. | 379/88.19 |
| 2007/0121871 | A1* | 5/2007 | Mullis et al. | 379/201.11 |
| 2007/0263803 | A1* | 11/2007 | Chan | 379/93.02 |
| 2009/0103701 | A1* | 4/2009 | Garg et al. | 379/142.04 |
| 2010/0020953 | A1* | 1/2010 | Lidstrom et al. | 379/142.04 |
| 2013/0016822 | A1* | 1/2013 | Vendrow | 379/211.01 |
| 2014/0128047 | A1 | 5/2014 | Edwards et al. | |
| 2014/0302828 | A1* | 10/2014 | Liu et al. | H04W 4/16 |
| 2015/0103990 | A1* | 4/2015 | Lee | H04M 3/436 |
| 2018/0020093 | A1* | 1/2018 | Bentitou et al. | H04M 3/4365 |

OTHER PUBLICATIONS

Goggle, "Timeline", printed Aug. 23, 2018, 1 page, https://www.google.com/maps/timeline.

Gmail, "Flexible, RESTful access to the user's inbox", printed Aug. 23, 2018, 1 page https://developers.google.com/gmail/api/.

Chou et al., "CaCM: Context-aware Call Management for Mobile Phones", 2017 IEEE 3rd International Conference on Collaboration and Internet Computing, Oct. 15-17, 2017, pp. 399-405.

\* cited by examiner

FILTERING UNSOLICITED INCOMING CALLS

BACKGROUND

The present disclosure relates generally to handling calls, and more particularly to handling an incoming call from a calling party to a called party.

Nuisance calls are a significant problem for users of communication systems. For example, unsolicited calls attempting to sell a product or service are common and can be frustrating to receive.

Existing communication devices (such as smartphones) have modes or settings (e.g. a "Do Not Disturb" mode) that enable a user to filter incoming calls based on whether the number (e.g. telephone number or identification number) associated with the calling party (i.e. caller) is found in the user's address book or contact list or from a sub-set of "favorite" contacts. In this way, incoming calls that are not from known contacts are automatically blocked or diverted directly to a message service, whereas calls from known contacts are treated conventionally by the device. However, such an approach relies on the user having stored all relevant/known numbers in their contact lists in advance, which may not be practical.

SUMMARY

The present disclosure provides a computer-implemented method for handling calls. The method comprises receiving an incoming call from a calling party, the incoming call being directed to a called party. The method also includes obtaining calling party information comprising a value of at least one descriptive parameter of the calling party, and obtaining historical called party information relating to activities of the called party. The method further comprises generating one or more call-handling rules based on the historical called party information, each call-handling rule defining how to handle an incoming call based on a descriptive parameter of the calling party. The method further comprises processing the calling party information according to the one or more call-handling rules to determine how to handle the received incoming call.

The present disclosure further provides a computer program product including computer program code for implementing the above described method when executed by a processing unit.

The present disclosure further provides a processing system adapted to execute the above described computer program code.

The present disclosure further provides a system for handling calls according to the computer-implemented method described.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain principles of the disclosure. The drawings are only illustrative of certain embodiments and do not limit the disclosure.

Figure 1:
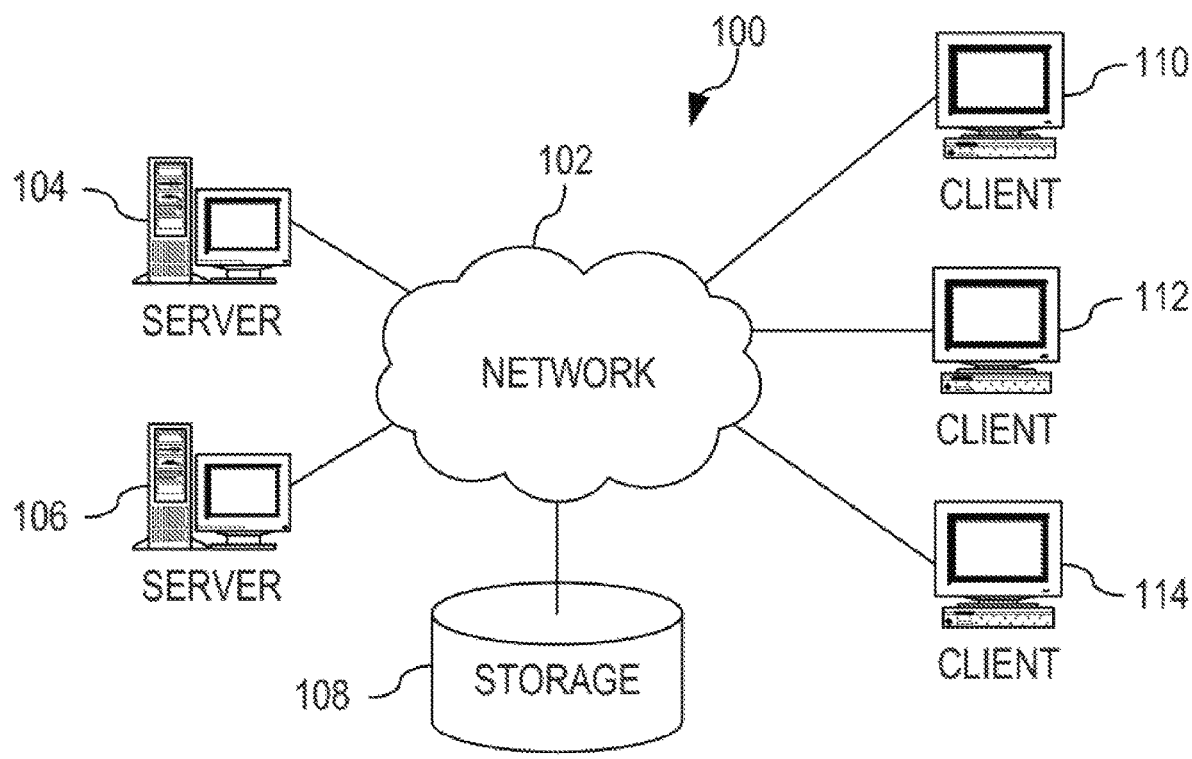
FIG. 1 depicts a pictorial representation of an example distributed system in which aspects of the illustrative embodiments can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present disclosure constitute a method, it should be understood that such a method can be a process for execution by a computer, i.e. can be a computer-implementable method. The various steps of the method can therefore reflect various parts of a computer program, e.g. various parts of one or more algorithms.

Also, in the context of the present application, a system can be a single device or a collection of distributed devices that are adapted to execute one or more embodiments of the methods of the present disclosure. For instance, a system can be a personal computer (PC), a server, or a collection of PCs and/or servers connected via a network such as a local area network, the Internet and so on to cooperatively execute at least one embodiment of the methods of the present disclosure.

Proposed is a concept for handling calls from unknown callers, for example, by determining whether to deny/block a call from being delivered to an intended recipient or called party. By obtaining historical information relating to past activities of the called party, call-handling rules can be generated in consideration of the past activities of the called party. Information about the calling party can also be obtained, and this information can then be processed according to the generated call-handling rules to determine how to handle the incoming call from the calling party. For example, an embodiment can dynamically generate a rule that an incoming call is to be permitted if a value of a descriptive parameter of the calling party (such as a location associated with the calling party) matches a permissible value of the descriptive parameter (such as a location recently visited by the called party). An automatic call verification/handling procedure that takes account of past activities of the called party can therefore be implemented for the called party, so that incoming calls directed to the called party are automatically processed to determine whether to deny or permit the incoming call. The call-handling rules employed by the call verification/handling procedure can be dynamically generated in consideration of past (e.g. recent) activities of the called party so as to account for changes, fluctuations, or developments in behavior or activities and thereby make more appropriate call handling decisions.

By way of example, some embodiments can observe a called party's activity in electronic messaging and/or internet searching and can use that information to determine rules that help to determine if an incoming call relates to (e.g. is resultant from) the called party's activity. In this way, incoming calls which result from the recent activities or actions of the called party can be identified and distinguished from incoming calls that are entirely unrelated to the called party's recent activities or actions (and thus unsolicited or uninvited). For example, if a value of a descriptive parameter of the calling party (e.g. location, business name, or business function) relates to a past activity (e.g. visited location, searched business, or searched business function) of the called party, it can be inferred that the calling party is making the incoming call because of the past activity of the called party, which can in turn suggest that the called party can be interested in receiving the incoming call. Conversely, if a value of a descriptive parameter of the calling party (e.g. location, business name, or business function) does not relate to a past activity (e.g. visited location, searched business, or searched business function) of the called party, it can be inferred that the calling party is not making the incoming call because of the past activity of the called party, which can, in turn, suggest that the called party may not be interested in receiving the incoming call.

Thus, proposed embodiments can be configured to dynamically generate call-handling rules that account for recent activities of the called party, and then use such call-handling rules to determine how to handle (e.g. deny, permit, re-direct, or reject) an incoming call. Such rules can ultimately be used to permit or deny incoming calls from being provided to the called party.

For clarification, reference to past activities of a called party is to be taken to refer to properties or characteristics of actions or activities that have been undertaken in a predetermined preceding time period prior to a current time at which an incoming call is received. This is because it is proposed that a called party can complete actions or activities that can cause or result in an incoming call being made by a calling party which would otherwise be considered as suspicious, unknown or unwanted (e.g. because the calling party is not known to the called party). One or more characteristics or parameters of the calling party can thus be used to determine if the incoming call relates to past activities of the called party and can therefore be of interest or relevance to the called party. For example, an incoming call can be made by a business that the called party previously visited, or by a called party that the called party previously emailed. Exemplary past activities of the called party can thus comprise at least one of: visited locations; electronic messages sent and/or received; and internet searches.

Also, reference to a call is to be taken to refer to a request to establish a communication session between a calling party and a called party. Such a communication session can, for example, comprise voice/audio communication, video communication, and/or chat/messaging communication, and should therefore not be assumed to only refer to a telephone call. Put another way, reference to a call can refer to a telephone call, video call, chat/messaging call, or other form of communication session between multiple parties. Embodiments can therefore be employed to handle various types of calls between parties, including video calls, chat calls, messaging calls, conference call, and the like.

Some embodiments can therefore provide methods and systems for handling incoming calls based on past activities of the called party. As the called party undertakes different activities over time, new or modified call-handling rules can be generated so as to account for a possibility that an incoming call can relate to the different activities. It is proposed that incoming calls associated with previous (e.g. recent) activities of the called party can be identified and distinguished from incoming calls that are spurious or unwanted.

Embodiments can provide numerous advantages which will now be discussed. However, the following advantages are not limiting, and embodiments of the present disclosure can exist realizing all, none, or some of the following advantages while remaining within the spirit and scope of the present disclosure. Some embodiments of the present disclosure provide the advantage that a called party need not configure call filtering in advance. Instead, embodiments can automatically use a variety of information about the called party's activities and compare such information with what can be established about the calling party, so as to automatically determine whether or not the incoming call from the calling party is likely to be of interest to the user. This can avoid the need for a called party to make use of a "do not disturb"-type mode (where all but a user-defined set of calls are denied/filtered) that can inadvertently block incoming calls that are relevant/important.

Proposed concepts can therefore provide an efficient and dynamic system and method for handling calls. Such handling of calls can, for example, comprise permitting or denying delivery of a call to a called party. The system and method can be capable of inferring if an incoming call can be of potential relevance or interest to the called party without the called party needing to set a call blocking or filtering mode that can be time-consuming, inconvenient and/or complex. Further, proposed embodiments can be capable of tracking changes in activities or actions of a called party over time, thus enabling a call handling rules to be responsive and/or dynamic.

Embodiments can provide concepts that facilitate the efficient and effective filtering of incoming calls. Such call-handling concepts can make use of a variety of data associated with a called party's prior activities (e.g. calendar entries, current and previous GPS locations, email and SMS messages, and web searches) to automatically determine whether or not the called party is likely to be interested in taking an incoming call. It is proposed that previous activity can be linked to an incoming call and used to reliably determine if an incoming call may be of interest to the called party.

By way of further example, embodiments can propose extensions to existing communication systems and/or call-handling systems. Such extensions can enable a communication system to provide additional and/or improved call filtering by leveraging proposed concepts. In this way, a conventional communication system can be upgraded by implementing or 'retro-fitting' one or more of the proposed embodiments described herein.

Illustrative embodiments can provide concepts for analyzing past activity of a called party and then generating call-handling rules based on one or more aspects of the called party's past activity. Dynamic call-handling concepts can therefore be provided by proposed embodiments.

Modifications and additional steps to a traditional call-handling/filtering system or method can also be proposed which can enhance the value and utility of the proposed concepts.

In some embodiments, generating one or more call-handling rules can comprise: based on the obtained historical called party information, identifying a descriptive parameter for checking; determining one or more permissible values of the identified descriptive parameter based on the obtained historical called party information; and defining a call-handling rule that the incoming call is to be permitted if a value of a descriptive parameter of the calling party matches a permissible value of the identified descriptive parameter. In this way, the call-handling rules can be dynamically generated, updated, or maintained to reflect slight variations in a user's activities. Such dynamic and continuous modification of call-handling rules can provide for improved accuracy and/or effectiveness of call-handling.

In some embodiments, processing the calling party information can comprise evaluating a value of a descriptive parameter of the calling party against the one or more call-handling rules to determine whether to permit or deny the incoming call. Embodiments can therefore employ simple techniques for assessing whether or not an incoming call may be of interest to the called party. This can facilitate simple and/or cheap implementation of embodiments, because simple comparison algorithms or components can be employed (rather than needing to develop unique or complex algorithms/components).

Embodiments can further comprise, if it is determined that the incoming call is to be permitted, selecting calling party information to be provided to the called party and providing the incoming call and the selected calling party information to the called party. In this way, pertinent information about the calling party can be provided to the user, thus providing the called party with useful information for the purpose of deciding whether or not to accept the call. For instance, rather than simply providing a number of the calling party (that can be unknown or unrecognizable to the called party), embodiments can provide more useful information to the called party, such as description (e.g. name, location, business type, etc.) of the calling party.

By way of example, the at least one descriptive parameter can comprise at least one of: a name of the calling party; a location associated with the calling party; a business name associated with the calling party; a business function associated with the calling party; a contact number of the calling party; a contact address of the calling party; and a contact electronic message address of the calling party. In this way, embodiments can obtain and leverage information that is more descriptive of a calling party than simply an identifier (e.g. telephone number or caller ID) associated with the calling party. This descriptive information can also facilitate simple assessment against past activities to determine if an incoming call can be of interest to the called party, for example, by direct comparison of one or more parameter values with values of past activities of the called party.

By way of further example, past activities of the called party comprise at least one of: visited locations; electronic messages sent and/or received; internet searches; calls made and/or received; social media activity; notes generated; reminders defined; and calendar entries. In this way, embodiments can obtain and leverage information that is descriptive of past activities or actions of a called party. This descriptive information can also facilitate simple generation of call-handling rules. For instance, in some embodiments, the one or more call-handling rules can comprise a rule defining that the incoming call is to be permitted if a value of a descriptive parameter of the calling party matches at least one of: a visited location of the called party; a sender of an electronic message received by the called party; a recipient of an electronic message sent by the called party; a subject of an electronic message sent or received by the called party; content of an electronic message sent or received by the called party; an internet search made by the called party; a result of an internet search made by the called party; a descriptive parameter of a call made and/or received by the called party; a social media user followed or contacted by the called party; content of a note generated by the called party; and a subject or time of a reminder defined by the called party. Embodiments can therefore use a wide range of information to determine if an incoming call should be permitted or denied.

Obtaining calling party information can, for example, comprise searching a database based on an identifier associated with the incoming call; and if a database entry for the identifier is identified, retrieving a value of a first descriptive parameter of the calling party from the identified database entry. Embodiments can also comprise searching the internet based on the retrieved value of the first descriptive parameter of the calling party; and based on the internet search results, retrieving a value of a second descriptive parameter of the calling party. In this way, embodiments can retrieve calling party information directly from an identifier (e.g. telephone number, caller ID) associated with the incoming call. However, embodiments can then leverage such retrieved information to obtain further information about the calling party. Put another way, a search for additional information can be undertaken using search results, and so on. Multiple levels of searching can therefore be employed to retrieve greater amounts of calling party information that can facilitate more accurate or effective call-handling decisions.

In some embodiments, if it is determined that the incoming call is to be denied, the incoming call can be provided to a voicemail service. This can enable automatic filtering of incoming calls that are determined to be irrelevant to the called party, whilst still enabling the called party to retrieve information about the filtered call (e.g. via a voicemail service) in case the incoming call is, in fact, of interest to the called party.

FIG. 1 depicts a pictorial representation of an exemplary distributed system in which aspects of the illustrative embodiments can be implemented. Distributed system 100 can include a network of computers in which aspects of the illustrative embodiments can be implemented. The distributed system 100 contains at least one network 102, which is the medium used to provide communication links between various devices and computers connected together within the distributed system 100. The network 102 can include connections, such as wire, wireless communication links, or fiber optic cables.

In the depicted example, a first server 104 and second server 106 are connected to the network 102 along with a storage unit 108. In addition, client 110, client 112, and client 114 are also connected to the network 102. The clients 110, 112, and 114 can be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 can include additional servers, clients, and other devices not shown.

In some embodiments, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 can also be implemented to include a number of different types of networks, such as for example, an intranet, a local area network (LAN), a wide area network (WAN), or the like. As stated above, FIG. 1 is intended as an example, not as an architectural limitation for different embodiments of the present disclosure, and therefore, the particular elements shown in FIG. 1 should not be considered limiting with regard to the environments in which the illustrative embodiments of the present disclosure can be implemented.

Figure 2:
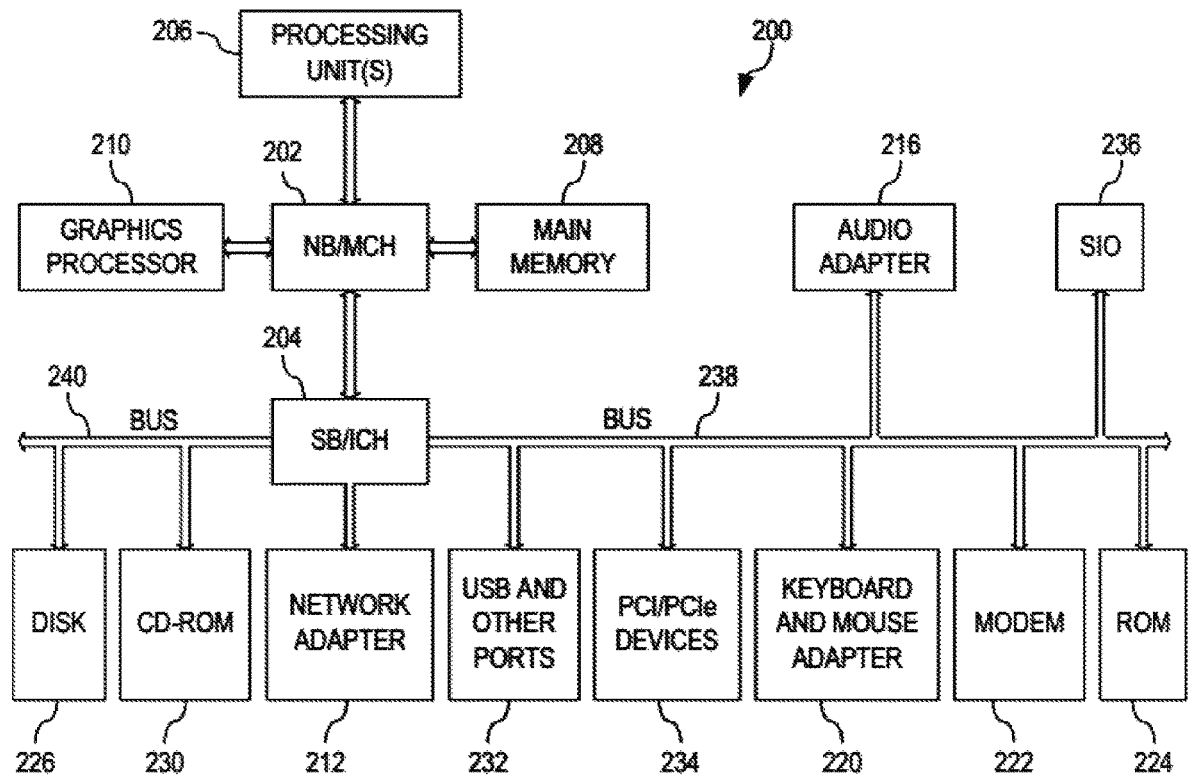
FIG. 2 is a block diagram of an example system in which aspects of the illustrative embodiments can be implemented.

FIG. 2 is a block diagram of an example system 200 in which aspects of the illustrative embodiments can be implemented. The system 200 is an example of a computer, such as client 110 in FIG. 1, in which computer usable code or instructions implementing the processes for illustrative embodiments of the present disclosure can be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 can be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices 234 can include, for example, Ethernet adapters, add-in cards, and PC cards for notebook computers. PCI uses a card bus controller, while PCIe does not. ROM 224 can be, for example, a flash basic input/output system (BIOS).

The HDD 226 and CD-ROM drive 230 connect to the SB/ICH 204 through second bus 240. The HDD 226 and CD-ROM drive 230 can use, for example, an integrated drive electronics (IDE) or a serial advanced technology attachment (SATA) interface. Super I/O (SIO) device 236 can be connected to SB/ICH 204.

An operating system runs on the processing unit 206. The operating system coordinates and provides control of various components within the system 200 in FIG. 2. As a client, the operating system can be a commercially available operating system. An object-oriented programming system, such as the Java™ programming system, can run in conjunction with the operating system and provides calls to the operating system from Java™ programs or applications executing on system 200.

As a server, system 200 can be, for example, an IBM® eServer™ System p® computer system, running the Advanced Interactive Executive (AIX®) operating system or the LINUX® operating system. The system 200 can be a symmetric multiprocessor (SMP) system including a plurality of processors in processing unit 206. Alternatively, a single processor system can be employed.

Instructions for the operating system, the programming system, and applications or programs are located on storage devices, such as HDD 226, and can be loaded into main memory 208 for execution by processing unit 206. Similarly, one or more message processing programs according to an embodiment can be adapted to be stored by the storage devices and/or the main memory 208.

The processes for illustrative embodiments of the present disclosure can be performed by processing unit 206 using computer usable program code, which can be located in a memory such as, for example, main memory 208, ROM 224, HDD 226, and/or CD-ROM drive 230.

A bus system, such as first bus 238 or second bus 240 as shown in FIG. 2, can comprise one or more buses. Of course, the bus system can be implemented using any type of communication fabric or architecture that provides for a transfer of data between different components or devices attached to the fabric or architecture. A communication unit, such as the modem 222 or the network adapter 212 of FIG. 2, can include one or more devices used to transmit and receive data. A memory can be, for example, main memory 208, ROM 224, or a cache such as found in NB/MCH 202 in FIG. 2.

Those of ordinary skill in the art will appreciate that the hardware in FIGS. 1 and 2 can vary depending on the implementation. Other internal hardware or peripheral devices, such as flash memory, equivalent non-volatile memory, or optical disk drives and the like, can be used in addition to, or in place of, the hardware depicted in FIGS. 1 and 2. Also, the processes of the illustrative embodiments can be applied to a multiprocessor data processing system, other than the system mentioned previously, without departing from the spirit and scope of the present disclosure.

Moreover, the system 200 can take the form of any of a number of different data processing systems including client computing devices, server computing devices, a tablet computer, laptop computer, telephone or other communication device, a personal digital assistant (PDA), or the like. In some illustrative examples, the system 200 can be a portable computing device that is configured with flash memory to provide non-volatile memory for storing operating system files and/or user-generated data, for example. Thus, the system 200 can essentially be any known or later-developed data processing system without architectural limitation.

Aspects of the present disclosure can enhance a communication system by facilitating call-handling decisions to be implemented in context of a called party's prior activities. Embodiments can process obtained calling party information in accordance with rules defining how to handle an incoming call based on calling party information. Similarities or relationships between the calling party information and historical called party information relating to past activities of the called party can be used to determine if an incoming call from the calling party is potentially relevant to the called party. Based on the identified matches or similarities between calling party information and historical called party information, a call-handling procedure can then be implemented. In this way, a spurious or irrelevant incoming call can be prevented from being delivered to the called party whereas a potentially relevant incoming called can be permitted to be delivered to the called party.

Figure 3:
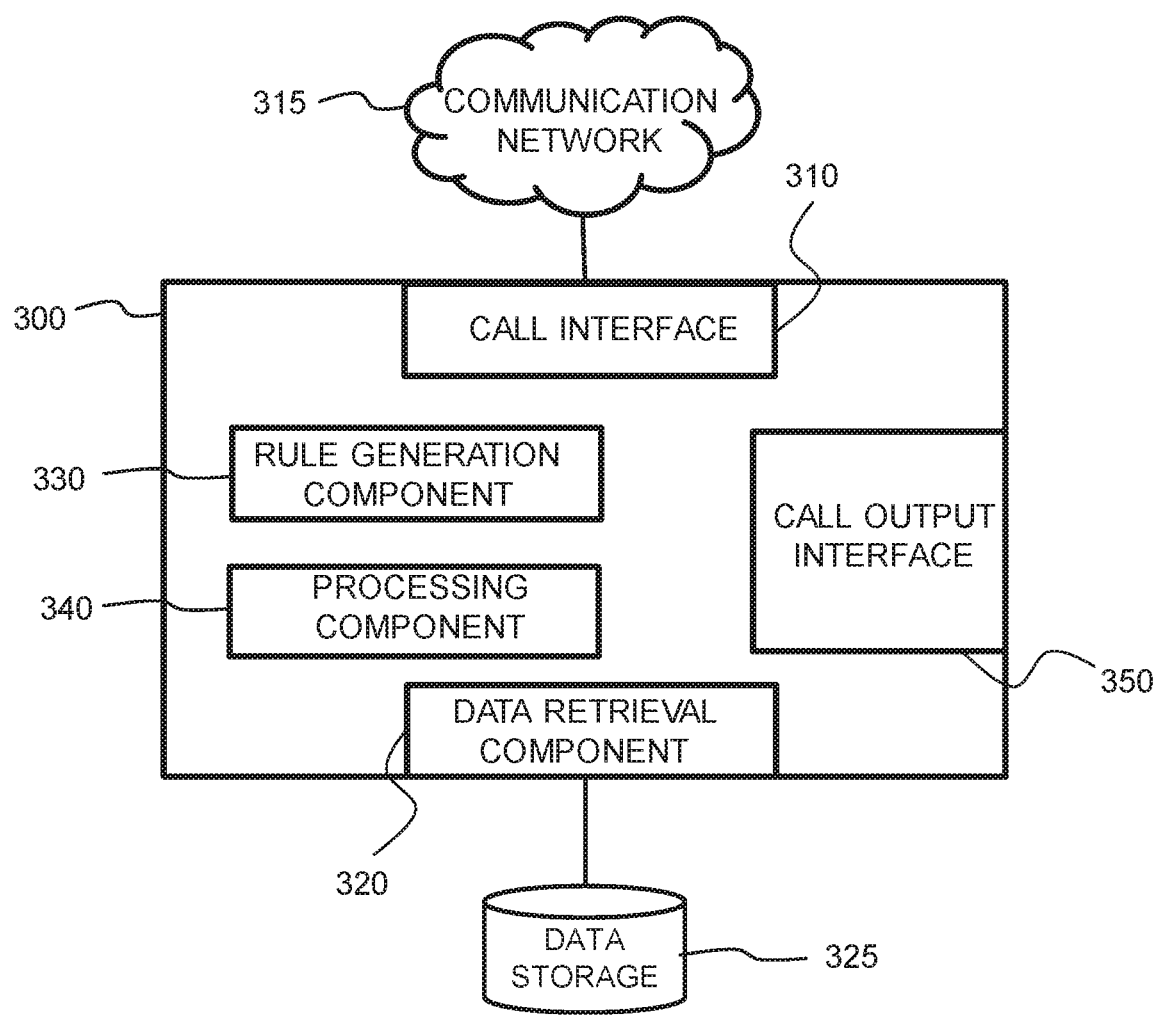
FIG. 3 is a simplified block diagram of a system for handling calls according to some embodiments of the present disclosure.

FIG. 3 is a simplified block diagram of a system 300 for handling calls according to some embodiments of the present disclosure.

Here, the system 300 comprises a call interface 310 configured to receive an incoming call. The incoming call is from a calling party and is directed to (e.g. addressed or intended for) a called party. In this example, the incoming call is sent (from the calling party) via a communication network 315. The communication network 315 can, for example, comprise the internet or a mobile phone network (or a combination thereof).

The system 300 also comprises a data retrieval component 320 configured to obtain calling party information comprising a value of at least one descriptive parameter of the calling party. In this example, the data retrieval component 320 is configured to search a database of a data storage unit 325 based on an identifier (e.g. telephone number, caller identifier, etc.) associated with the incoming call. If a database entry for the identifier is identified, the data retrieval component 320 can then retrieve a value of a first descriptive parameter of the calling party from the identified database entry. In this way, the system 300 can obtain and leverage information that is more descriptive of a calling party than simply the identifier (e.g. telephone number or caller ID) associated with the calling party. It will therefore be understood that the system 300 can retrieve calling party information directly from an identifier (e.g. telephone number or caller ID) associated with the incoming call.

The system 300 can leverage such retrieved information to obtain further information about the calling party. Put another way, the data retrieval component 320 can be further configured to search for additional information using the retrieved information, and so on. For instance, the data retrieval component 320 can be further configured to search the data storage unit 325 and/or the Internet based on the retrieved value of the first descriptive parameter of the calling party. Based on such further search results, the data retrieval component 320 can retrieve a value of a second descriptive parameter of the calling party. Multiple levels of searching can be employed to retrieve significant amounts of calling party information that can facilitate more accurate or effective call-handling decisions.

The data retrieval component 320 of the system 300 is also configured to obtain historical called party information relating to past activities of the called party. By way of example, past activities of the called party can comprise one or more of: visited locations; electronic messages sent and/or received; internet searches; calls made and/or received; social media activity; notes generated; reminders defined; and calendar entries. The data retrieval component 320 can be adapted to access and/or search various data sources in order to obtain historical called party information relating to past activities of the called party. Such data sources can, for example, include: GPS logs; location tracking applications; electronic messaging applications; electronic messaging services and/or records; searching applications; searching records/logs; call logs; communication applications; social media applications; contact lists; calendar applications; note applications; reminder applications; and the like.

The system 300 also comprises a rule generation component 330 that is configured to generate one or more call-handling rules based on the obtained historical called party information. A call-handling rule generated by the rule generation component 330 can define how to handle an incoming call based on a descriptive parameter of a calling party.

By way of example, the rule generation component 330 of the exemplary system 300 of FIG. 3 can be configured to identify a descriptive parameter for checking, based on the obtained historical called party information. The rule generation component 330 then determines one or more permissible values of the identified descriptive parameter based on the obtained historical called party information. The rule generation component 330 subsequently defines a call-handling rule that the incoming call is to be permitted if a value of a descriptive parameter of the calling party (such as a location associated with the calling party) matches a permissible value of the identified descriptive parameter (such as visited location of the called party). In this way, the rule generation component 330 can dynamically generate call-handling rules in consideration of past (e.g. recent) activities of the called party so as to account for changes, fluctuations, or developments in behavior or activities of the called party.

By way of further example, the one or more call-handling rules can comprise a rule defining that the incoming call is to be permitted if a value of a descriptive parameter of the calling party matches at least one of: a visited location of the called party; a sender of an electronic message received by the called party; a recipient of an electronic message sent by the called party; a subject of an electronic message sent or received by the called party; content of an electronic message sent or received by the called party; an internet search made by the called party; a result of an internet search made by the called party; a descriptive parameter of a call made and/or received by the called party; a social media user followed or contacted by the called party; content of a note generated by the called party; and a subject or time of a reminder defined by the called party. The system 300 can therefore make use of a wide range of information to determine if an incoming call should be permitted or denied.

For such a purpose, the system 300 comprises a processing component 340 that is configured to process the calling party information according to the one or more call-handling rules to determine how to handle the received incoming call. Here, the processing component 340 is configured to evaluate a value of a descriptive parameter of the calling party against the one or more call-handling rules to determine whether to permit or deny the incoming call.

In the embodiment of FIG. 3, the system 300 also comprises a call output interface 350 configured to select calling party information to be provided to the called party, if it is determined that the incoming call is to be permitted, and to then provide the incoming call and the selected calling party information to the called party. In this way, the called party can be provided with the incoming call along with information about the calling party that can help the called party to identify the calling party and decide whether or not to accept the incoming call.

From the above description, it will be understood that the system 300 of FIG. 3 can handle (e.g. permit or deny) incoming calls based on past activities of the called party. As the called party can undertake different activities over time, call-handling rules can be dynamically generated in response to receiving an incoming call so as to account for a possibility that an incoming call can relate to one or more recent activities of the called party. Based on such call-handling rules, incoming calls that are associated with previous (e.g. recent) activities of the called party can be identified and delivered to the called party along with information about the calling party. Conversely, incoming calls that are spurious or unwanted (e.g. are not associated with previous (e.g. recent) activities of the called party) can be identified and not delivered to the called party.

The system 300 can therefore provide the advantage that a called party need not configure call filtering in advance. Instead, the system 300 can automatically use a variety of information about the called party's activities, and compare such information with the data retrieved about the calling party so as to automatically determine whether or not the incoming call from the calling party is likely to be of interest to the user. Here, it is noted that the called party can therefore remain unaware that such checks are happening. Thus, aspects of the present disclosure improve the technology of call filtering by creating call handling rules from a variety of retrieved data. Furthermore, aspects of the present disclosure improve the usability of call filtering by enabling call filtering without substantial user input.

The embodiment presented in FIG. 3 can continuously assess incoming calls over time and generate new or modified call-handling rules as activities of a called party change over time.

By way of further example, three exemplary implementations of proposed concepts will now be detailed. In each example below, the called party does not already have the calling party's details already stored in their contact list(s)/database(s), but a match can be found between publicly available information associated with the calling party (e.g. returned via search engine results) and historical called party information relating to past activities of the called party (e.g. obtained from calendar entries, GPS location history, recent email history, etc.)

(i) The called party had an appointment with their bank manager earlier in the day (an entry for which is in the called party's calendar). If the bank manager calls later that same day, it can be inferred that the called party may want to receive the call.

(ii) The called party stopped by a cafe (as indicated by GPS location history and/or Wi-Fi access point history) on the way home from visiting the bank manager. Unbeknown to the called party, he/she left his/her bag at the cafe, and someone from the cafe phones the user to tell them. Matching the location or business associated with the incoming call against the history of the called party, it can be determined that the called party will be interested in receiving the incoming call.

(iii) A friend recently emailed the called party about a plumber that he/she used. The friend has told the plumber that the called party is looking to have a bathroom remodeled soon, and so the plumber calls the called party to offer to come and provide a quote. Matching the business description associated with the incoming call against the email content, it can be determined that the called party will be interested in receiving the incoming call from the plumber.

In each of the above three examples, proposed embodiments would determine that the incoming call was from a calling party that is of interest to the called party, and would permit (e.g. let through) the call and display calling party information (e.g. "Barclays A, City A", "Café Name, City A", etc.) obtained for the incoming call (e.g. from a database or via an internet search).

Referring now to FIGS. 4A-4D, there is depicted a flow diagram of a method for handling calls according to some embodiments of the present disclosure.

For the purpose of better explaining FIGS. 4A-4D, assume that the user (i.e. called party) is the owner of a smartphone (which is adapted to implement the method) and does not want to be disturbed by unnecessary calls (e.g. unsolicited sales calls). The user does, however, wish to be alerted to any relevant incoming calls. Accordingly, the user activates a setting (or application) on the smartphone that turns on the enhanced call handling method according to aspects of the present disclosure.

The method begins with step 400 wherein an incoming call is received. Next, in step 405, and before the called party is notified, the phone number of the incoming call is searched (e.g., queried) within a publicly accessible database of phone numbers. In this way, an identifier associated with the incoming call can be used to retrieve more information about the calling party.

In step 410, it is determined if a match for the phone number is found within the database. To save time and/or reduce required resource for the searching process, the determination can be limited to a predetermined number of search results.

If, in step 410, it is determined that no match is found, the method proceeds to step 415. In step 415, the smartphone is controlled to revert to normal phone behavior (e.g. if in "Do not disturb" mode, the incoming call is diverted to voice mail) and the method ends.

Conversely, if in step 410 it is determined that a match is found, the method proceeds to step 420 wherein accompanying data (i.e. calling party information) is obtained from the search result, such as name, location, etc. linked to the phone number associated with the incoming call. In this example, such obtained calling party information comprises a business name such as "Super Garage" and an address such as "1 The High Street, City A, Post Code ABC123".

After completing step 420, the method proceeds to step 422 wherein entries in the called party's calendar are retrieved (e.g. using an Application Programming Interface (API)).

In step 425, it is then determined if a match between the obtained calling party information and the calendar entries is found. If in step 425 it is determined that a match is found, the method proceeds to step 430. In step 430, the incoming call is let through (i.e. permitted) and part or all of the obtained calling party information is displayed to the called party (using a display of the smartphone), and the method then ends. For instance, in step 425, it can be found that there is a recently entered calendar item with the subject "Car MOT at Super Garage", thus resulting in a match between part of the obtained calling party information and the subject of a calendar entry of the called party. This would result in the incoming call being provided to the called party accompanied with the text "Super Garage" displayed on a display of the called party's smartphone.

Figure 4A:
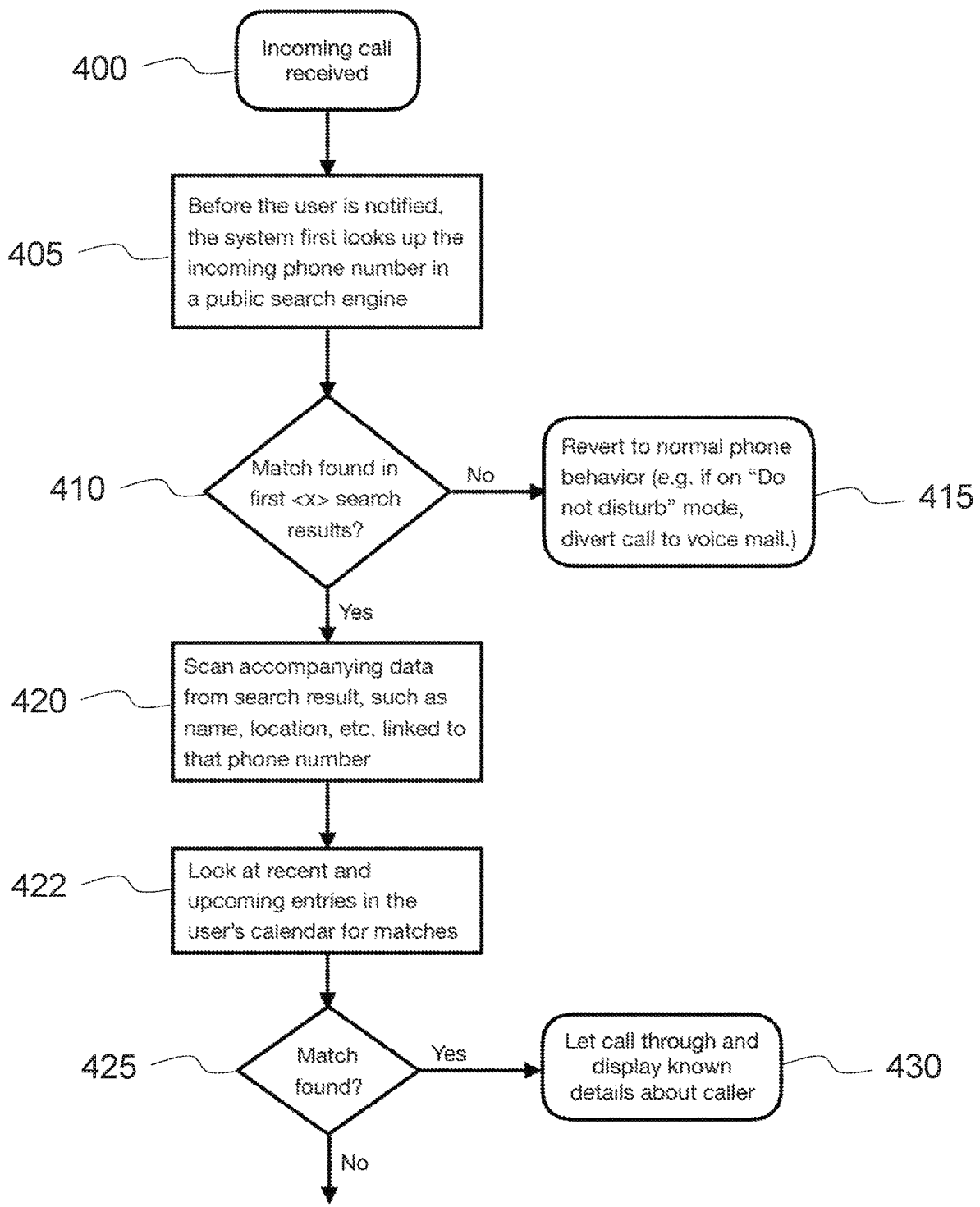
FIG. 4A depicts a first portion of a flowchart for handling calls, in accordance with embodiments of the present disclosure.
Figure 4B:
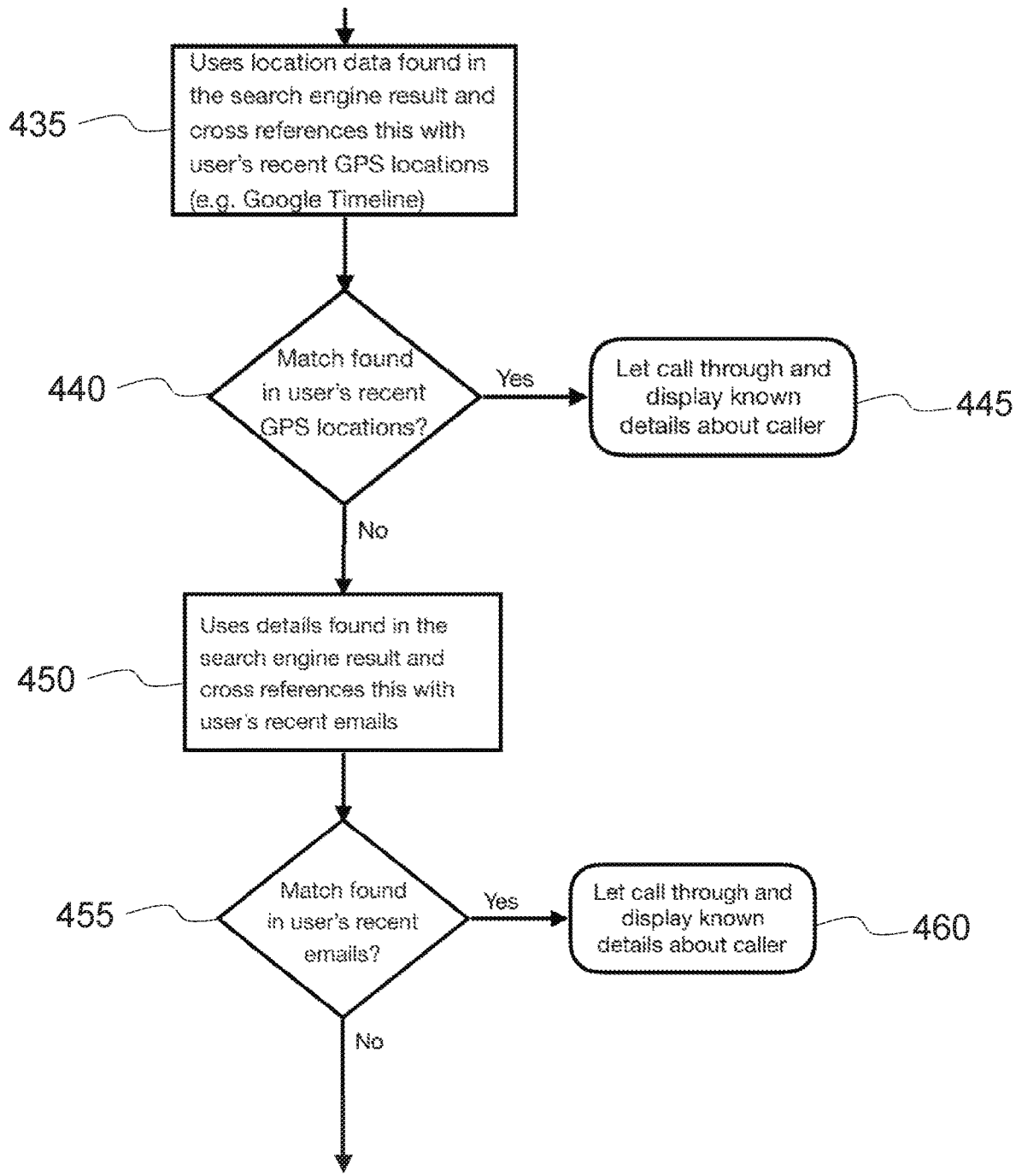
FIG. 4B depicts a second portion of a flowchart for handling calls, in accordance with embodiments of the present disclosure.

Conversely, if in step 425 it is determined that no match is found between the obtained calling party information and the calendar entries, the method proceeds to step 435 of FIG. 4B.

In step 435 of FIG. 4B, location data of the calling party (as obtained from the search engine result(s)) is cross referenced against the called party's recent GPS locations (e.g. retrieved from a location monitoring application). As an example, such obtained calling party information can include a business name such as "Café A" and an address such as "1 The High Street, City A, Post Code ABC123".

It is then determined in step 440 whether a match is found between the location data of the calling party and the called party's recent GPS locations.

If, in step 440, it is determined that a match on location data is found, the method proceeds to step 445 wherein the incoming call is let through and part (or all) of the obtained calling party information is displayed to the called party. For instance, in step 440, it can be found that the called party visited "1 The High Street, City A, Post Code ABC123" the previous day, thus resulting in a match between part of the obtained calling party information and a location visited by the called party. This would result in the incoming call being provided to the called party accompanied with text such as, for example, "Café A—visited yesterday" displayed on a display of the called party's smartphone.

Conversely, if in step 440, it is determined that no match is found between the obtained calling party information and the location data, the method proceeds to step 450.

In step 450, name, business and business description information of the calling party (as obtained from the search engine result(s)) is cross referenced against the called party's recent email activity (e.g. retrieved from an email application). As an example, such obtained calling party information can include a business name such as "Plumbing Company A" and an occupation, service, or category such as "Plumber" and an address such as "Main Road, City B, Post Code 123ABC".

It is then determined in step 455 whether a match is found between the name, business, and/or business description information of the calling party and the called party's recent email activity.

If, in step 455, it is determined that there is a match in email activity data, the method proceeds to step 460 wherein the incoming call is let through and part (or all) of the obtained calling party information is displayed to the called party. For instance, in step 455, it can be found that the called party emailed a friend asking about "Plumbing Company A", thus resulting in a match between part of the obtained calling party information and an email sent by the called party. This would result in the incoming call being provided to the called party in step 460 accompanied with text such as, for example, "Plumbing Company A—recently emailed" displayed on a display of the called party's smartphone.

Figure 4C:
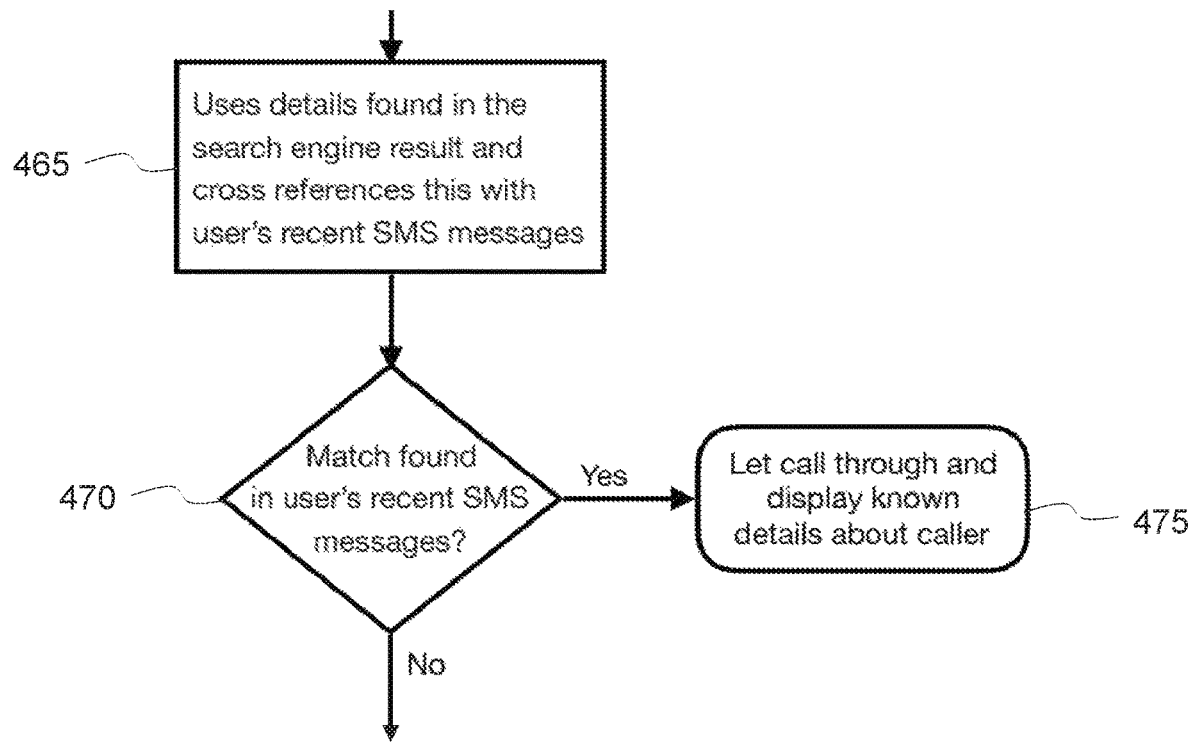
FIG. 4C depicts a third portion of a flowchart for handling calls, in accordance with embodiments of the present disclosure.

Conversely, if in step 455, it is determined that no match is found between the obtained calling party information and the email activity, the method proceeds to step 465 in FIG. 4C.

In step 465 of FIG. 4C, the name, business, and business description information of the calling party (as obtained from the search engine result(s)) is cross referenced against the called party's recent messaging activity (e.g. retrieved from a messaging application). In this example, such obtained calling party information can be the previously discussed "Plumbing Company A," "Plumber," and "Main Road, City B, Post Code 123ABC".

It is then determined in step 470 whether a match is found between the name, business and/or business description information of the calling party and the called party's recent messaging activity.

If, in step 470, it is determined that there is a match in messaging activity data, the method proceeds to step 475 wherein the incoming call is let through and part (or all) of the obtained calling party information is displayed to the called party. For instance, in step 470, it can be found that the called party received a messaged from a known contact (e.g. friend) recommending "Plumbing Company A", thus resulting in a match between part of the obtained calling party information and a message received by the called party. This would result in the incoming call being provided to the called party in step 475 accompanied with text such as, for example, "Plumbing Company A—mentioned in message from *friend's name*'" displayed on a display of the called party's smartphone.

Figure 4D:
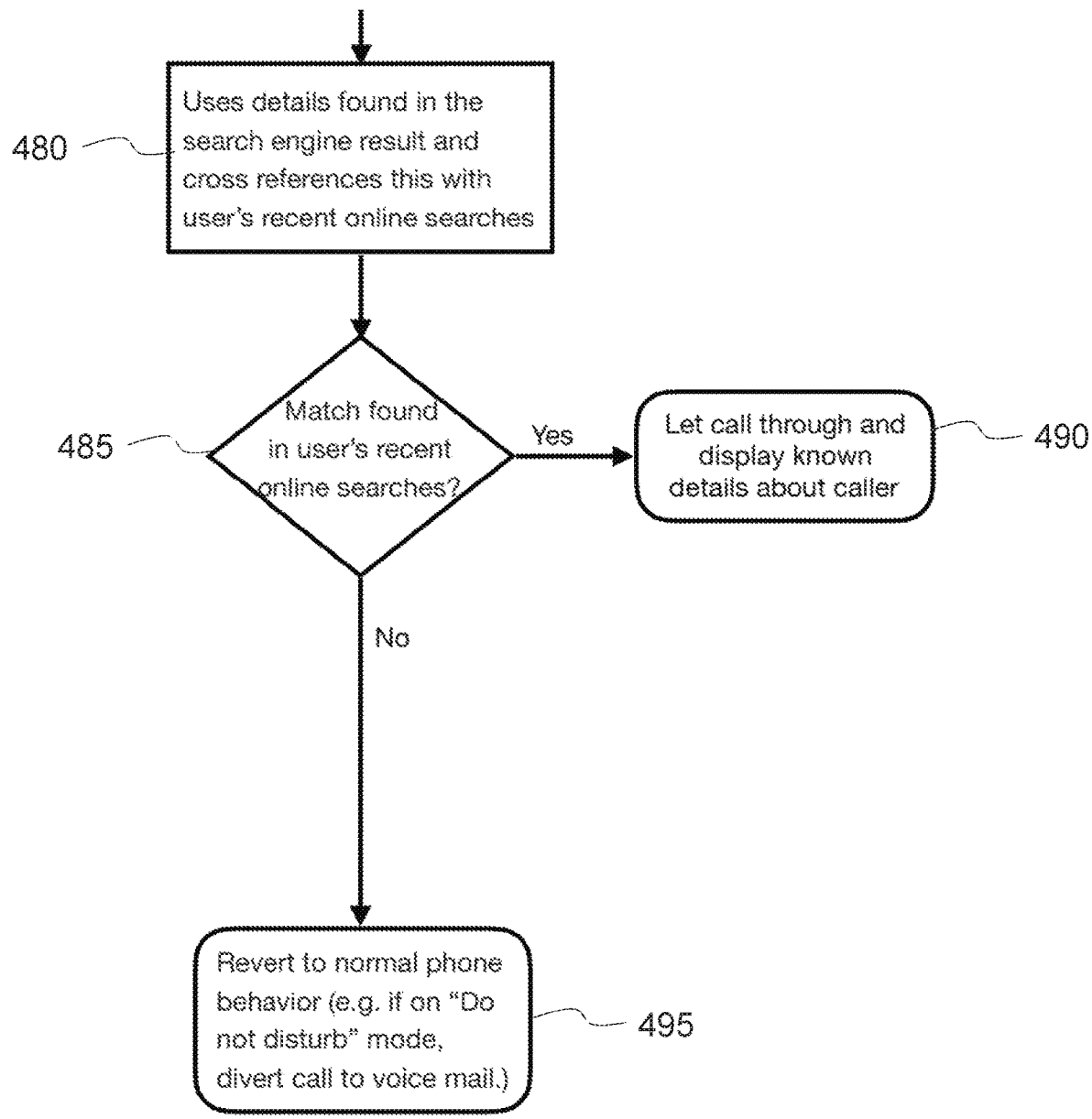
FIG. 4D depicts a fourth portion of a flowchart for handling calls, in accordance with embodiments of the present disclosure.

Conversely, if in step 470, it is determined that no match is found between the obtained calling party information and the messaging activity, the method proceeds to step 480 in FIG. 4D.

In step 480 of FIG. 4D, the name, business and business description information of the calling party (as obtained from the search engine result(s)) is cross referenced against the called party's recent online searching activity (e.g. retrieved from an internet browser history). In this example, the obtained calling party information again comprises "Plumbing Company A" "Plumber" "Main Road, City B, Post Code 123ABC".

It is then determined in step 485 whether a match is found between the name, business, and/or business description information of the calling party and the called party's recent online searching activity.

If, in step 485, it is determined that there is a match in messaging activity data, the method proceeds to step 490 wherein the incoming call is let through and part (or all) of the obtained calling party information is displayed to the called party. For instance, in step 490, it can be found that the called party searched for "Plumbing Company City A", thus resulting in a match between part of the obtained calling party information and a search made by the called party. This would result in the incoming call being provided to the called party in step 490 accompanied with text such as, for example, "Plumbing Company A—recently searched for" displayed on a display of the called party's smartphone.

Conversely, if in step 485, it is determined that no match is found between the obtained calling party information and the searching activity, the method proceeds to step 495.

In step 495, the smartphone of the called party is controlled to revert to normal phone behavior (e.g. if on "Do not disturb" mode, divert call to voice mail.)

Thus, incoming calls that the user is likely to be interested in taking (as inferred from recently completed activity of the called party) are let through (i.e. the phone rings, vibrates, etc. to make the user aware of the call). All other calls can then be diverted to the user's voicemail or rejected outright.

It is to be appreciated that the method described in FIGS. 4A-4D is only exemplary. Other types of calling party information and/or historical called party information relating to past activities of the called party can therefore be employed in alternative embodiments that employ the proposed concept(s).

For example, the called party's calendar entries can provide a useful source of historical called party information relating to past activities of the called party upon which processing rules could be built. For instance, if a search of the called party's recently created calendar entries finds that there was an entry last week entitled "Visit vets" and the incoming call is from a local veterinarian, a processing rule can be defined which is adapted to let the call through (as it is likely to be of interest to the user).

By way of further example, a contact email address of the calling party can be useful calling party information, because the called party may not have the calling party's phone number stored. A search of the called party's email account (or contact list) might find that the called party has previously sent/received an email to/from the email address of the calling party (which would again suggest that the called party can wish to receive the incoming call). A call-handling rule can be generated to implement such a check.

Other exemplary checks between calling party information and historical called party information can include:

(i) The called party's calendar entries, for example, if the called party has a recent calendar entry entitled "Visit vets" and the incoming call is determined to be from a local veterinarian, the user will likely be interested in taking the call;

(ii) The called party's social media activity—For example, if the called party follows a certain organization or business on a social media platform (or has previously posted a comment about said organization or business) such information could also be used when creating/executing call handling processing rules;

(iii) The called party's smartphone notes application or to-do list application—for example, a native "Reminders" application can include to-do items that have previously been defined by the called party, such as "Phone estate agents" or "contact doctors" or "speak to school" etc. In such an example, if the incoming call is determined to be from a local real estate agent, doctor, or school, then such information can be used in a call-handling rule.

Figure 5:
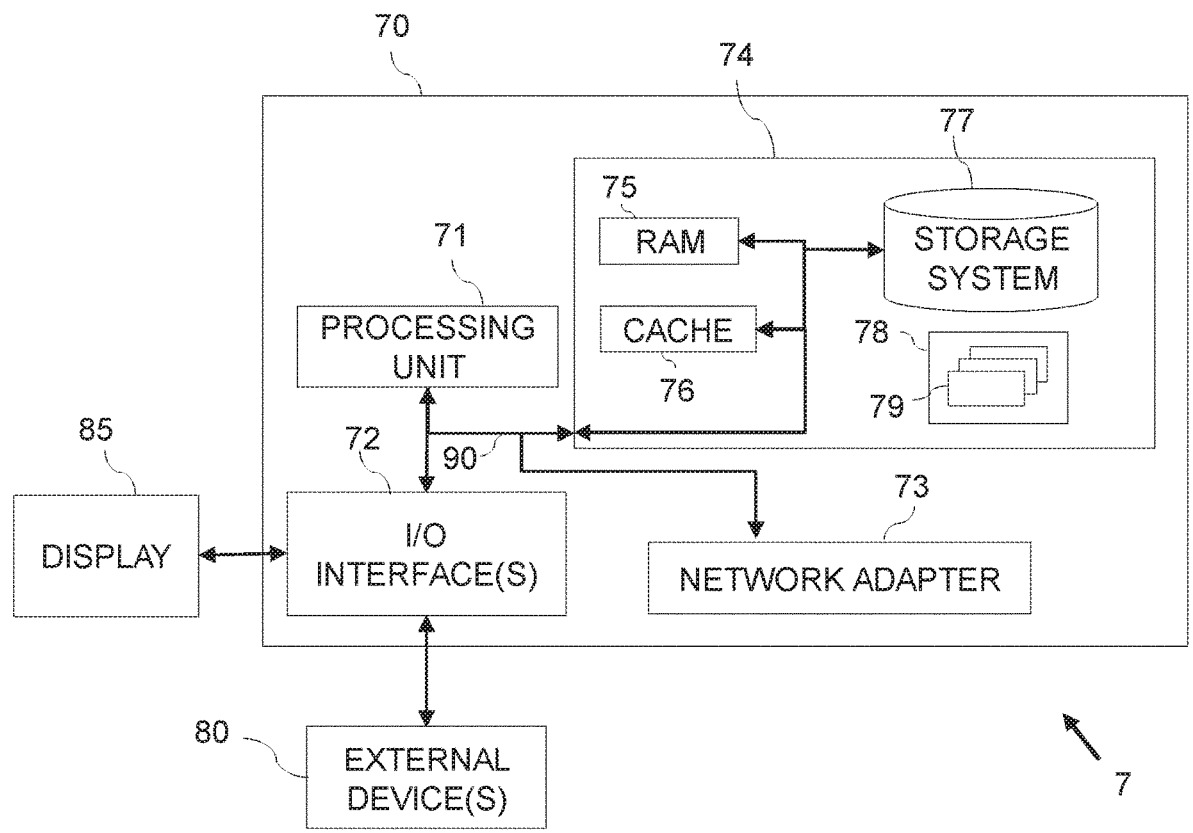
FIG. 5 illustrates a system for verifying a user of a computer system according to some embodiments of the present disclosure.

By way of further example, as illustrated in FIG. 5, embodiments can comprise a computer system/server 70, which can form part of a networked system 7. The components of computer system/server 70 can include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media can be any available media that is accessible by computer system/server 70, and it includes both volatile and non-volatile media, removable and non-removable media.

System memory 74 can include computer system readable media in the form of volatile memory, such as random-access memory (RAM) 75 and/or cache memory 76. Computer system/server 70 can further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 can include at least one program product having a set (e.g., at least one) of program modules that are configured to carry out the functions of embodiments of the present disclosure.

Program/utility 78, having a set (at least one) of program modules 79, can be stored in memory 74 by way of example, and not limitation, as well as an operating system, one or more application programs, other program modules, and program data. Each of the operating system, one or more application programs, other program modules, and program data or some combination thereof, can include an implementation of a networking environment. Program modules 79 generally carry out the functions and/or methodologies of embodiments of the present disclosure as described herein.

Computer system/server 70 can also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for handling calls, the method comprising:
   receiving an incoming call from a calling party, the incoming call being directed to a called party;
   determining the calling party is unknown to the called party;
   obtaining, in response to determining the calling party is unknown, calling party information comprising at least one descriptive parameter of the calling party and a value for each of the at least one descriptive parameter;
   obtaining historical called party information related to a plurality of past activities of the called party, wherein the plurality of past activity includes a recent activity;
   generating one or more call-handling rules based on the historical called party information, each call-handling rule defining how to handle the incoming call based on the at least one descriptive parameter of the calling party, wherein generating the one or more call handling rules comprises:
   identifying a first descriptive parameter and a first value corresponding to the first descriptive parameter;

determining a first permissible value of the first descriptive parameter, wherein the first permissible value is related to the recent activity, and wherein the recent activity occurred within a predetermined period of time; and defining the one or more call-handling rules that the incoming call is to be permitted in response to the first value of the first descriptive parameter of the calling party matching the first permissible value of the first descriptive parameter; and processing the incoming call based on the calling party information and the one or more call-handling rules to determine how to handle the incoming call.

2. The method of claim 1, wherein processing the incoming call comprises:

evaluating the first value of the first descriptive parameter of the calling party against the one or more call-handling rules to determine whether to permit the incoming call.

3. The method of claim 2, further comprising:

in response to determining that the incoming call is to be permitted, selecting the calling party information to be provided to the called party; and providing the incoming call and the selected calling party information to the called party.

4. The method of claim 1, wherein the at least one descriptive parameter is selected from the group consisting of:

a name of the calling party, a location associated with the calling party, a business name associated with the calling party, a business function associated with the calling party, a contact number of the calling party, a contact address of the calling party, and a contact electronic message address of the calling party.

5. The method of claim 1, wherein the plurality of past activities of the called party is selected from the group consisting of:

location history, electronic message history, internet search history, call history, social media history, notes, reminders, and calendar entries.

6. The method of claim 5, wherein the one or more call-handling rules comprises a rule defining that the incoming call is to be permitted in response to the value of the descriptive parameter of the calling party satisfying the rule, wherein the descriptive parameter is selected from the group consisting of:

a visited location of the called party, a sender of an electronic message received by the called party, a recipient of an electronic message sent by the called party, a subject of an electronic message of the called party, content of an electronic message of the called party, an internet search made by the called party, a result of an internet search made by the called party, a descriptive parameter of a call made by the called party, a descriptive parameter of a call received by the called party, a social media user followed by the called party, content of a note generated by the called party, and a subject of a reminder defined by the called party.

7. The method of claim 1, wherein obtaining the calling party information comprises:

searching a database based on an identifier number associated with the incoming call; and in response to identifying a database entry for the identifier, retrieving a first value of a first descriptive parameter of the calling party from the database entry.

8. The method of claim 7, further comprising:

searching the internet based on the retrieved value of the first descriptive parameter of the calling party; and based on the internet search results, retrieving a second value of a second descriptive parameter of the calling party.

9. The method of claim 1, further comprising:

in response to determining that the incoming call is to be denied, providing the incoming call to a voicemail service.

10. A computer program product for handling calls, the computer program product comprising a non-transitory computer readable storage medium having program instructions embodied therewith, the program instructions executable by a processing unit to cause the processing unit to perform a method comprising:

receiving an incoming call from a calling party, the incoming call being directed to a called party;

determining the calling party is unknown to the called party;

obtaining, in response to determining the calling party is unknown, calling party information comprising at least one descriptive parameter of the calling party and a value for each of the at least one descriptive parameter;

obtaining calling party information comprising at least one descriptive parameter of the calling party and a value for each of the at least one descriptive parameter;

obtaining historical called party information related to a plurality of past activities of the called party, wherein the plurality of past activity includes a recent activity;

generating one or more call-handling rules based on the historical called party information, each call-handling rule defining how to handle the incoming call based on the at least one descriptive parameter of the calling party, wherein generating the one or more call-handling rules comprises:

identifying a first descriptive parameter and a first value corresponding to the first descriptive parameter;

determining a first permissible value of the first descriptive parameter, wherein the first permissible value is related to the recent activity, and wherein the recent activity occurred within a predetermined period of time; and defining the one or more call-handling rules that the incoming call is to be permitted in response to the first value of the first descriptive parameter of the calling party matching the first permissible value of the first descriptive parameter; and processing the incoming call based on the calling party information and the one or more call-handling rules to determine how to handle the incoming call.

11. A system for handling calls comprising:

a processor; and a computer-readable storage medium communicatively coupled to the processor and storing program instructions which, when executed by the processor, are configured to cause the processor to perform a method comprising:

receiving an incoming call from a calling party, the incoming call being directed to a called party;

determining the calling party is unknown to the called party;

obtaining, in response to determining the calling party is unknown, calling party information comprising at least one descriptive parameter of the calling party and a value for each of the at least one descriptive parameter;

obtaining historical called party information related to a plurality of past activities of the called party, wherein the plurality of past activity includes a recent activity;

generating one or more call-handling rules based on the historical called party information, each call-handling rule defining how to handle the incoming call based on the at least one descriptive parameter of the calling party, wherein generating the one or more call-handling rules comprises:

identifying a first descriptive parameter and a first value corresponding to the first descriptive parameter;

determining a first permissible value of the first descriptive parameter, wherein the first permissible value is related to the recent activity, and wherein the recent activity occurred within a predetermined period of time; and defining the one or more call-handling rules that the incoming call is to be permitted in response to the first value of the first descriptive parameter of the calling party matching the first permissible value of the first descriptive parameter; and processing the incoming call based on the calling party information and the one or more call-handling rules to determine how to handle the incoming call.

12. The system of claim 11, wherein the program instructions are further configured to cause the processor to perform a method further comprising evaluating the first value of the first descriptive parameter of the calling party against the one or more call-handling rules to determine whether to permit the incoming call.

13. The system of claim 11, wherein the program instructions are further configured to cause the processor to perform a method further comprising selecting calling party information to be provided to the called party in response to determining that the incoming call is to be permitted, and providing the incoming call and the selected calling party information to the called party.

14. The system of claim 11, wherein the past activities of the called party is selected from the group consisting of:

location history, electronic message history, internet search history, call history, social media history, notes, reminders, and calendar entries.

15. The system of claim 14, wherein the one or more call-handling rules comprises a rule defining that the incoming call is to be permitted in response to the value of the descriptive parameter of the calling party satisfying the rule, wherein the descriptive parameter is selected from the group consisting of:

a visited location of the called party, a sender of an electronic message received by the called party, a recipient of an electronic message sent by the called party, a subject of an electronic message of the called party, content of an electronic message of the called party, an internet search made by the called party, a result of an internet search made by the called party, a descriptive parameter of a call made by the called party, a descriptive parameter of a call received by the called party, a social media user followed by the called party, content of a note generated by the called party, and a subject of a reminder defined by the called party.

16. The system of claim 11, wherein the program instructions are further configured to cause the processor to perform a method further comprising:

searching a database based on an identifier associated with the incoming call; and in response to identifying a database entry for the identifier, retrieving a first value of a first descriptive parameter of the calling party from the identified database entry.

17. The system of claim 16, wherein the program instructions are further configured to cause the processor to perform a method further comprising:

searching the internet based on the first value of the first descriptive parameter of the calling party; and based on the internet search results, retrieving a second value of a second descriptive parameter of the calling party.

* * * * *